United States Patent
Hua et al.

(10) Patent No.: US 8,295,223 B2
(45) Date of Patent: Oct. 23, 2012

(54) WIRELESS CONNECTION METHOD AND DEVICE

(75) Inventors: Jin Hua, Shenzhen (CN); Xujun Wang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/302,898

(22) Filed: Nov. 22, 2011

(65) Prior Publication Data

US 2012/0063359 A1    Mar. 15, 2012

Related U.S. Application Data

(63) Continuation of application No. 13/091,273, filed on Apr. 21, 2011.

(30) Foreign Application Priority Data

Apr. 21, 2010  (CN) .......................... 2010 1 0153065

(51) Int. Cl.
    *H04W 28/18*  (2009.01)
(52) U.S. Cl. ........................................... 370/315; 455/9
(58) Field of Classification Search .................. 370/315; 455/9, 15
    See application file for complete search history.

(56) References Cited

U.S. PATENT DOCUMENTS

| 7,626,966 | B1 | 12/2009 | Ruiter et al. |
| 8,014,338 | B2 | 9/2011 | Lee et al. |
| 2005/0153725 | A1 | 7/2005 | Naghian et al. |
| 2005/0232223 | A1 | 10/2005 | Muller |
| 2006/0280138 | A1 | 12/2006 | Nanda et al. |
| 2007/0155315 | A1 | 7/2007 | Lee et al. |
| 2007/0281613 | A1 | 12/2007 | Lee et al. |
| 2008/0080412 | A1 | 4/2008 | Cole et al. |
| 2009/0029645 | A1 | 1/2009 | Leroudier |
| 2009/0097433 | A1 | 4/2009 | Shen et al. |
| 2009/0157657 | A1* | 6/2009 | Kim et al. .......................... 707/5 |
| 2009/0307484 | A1* | 12/2009 | Zhang et al. .................. 713/153 |
| 2010/0150022 | A1* | 6/2010 | Cai et al. ........................ 370/254 |
| 2011/0189944 | A1 | 8/2011 | Wang et al. |
| 2011/0314522 | A1* | 12/2011 | Palanigounder et al. ......... 726/4 |

FOREIGN PATENT DOCUMENTS

| CN | 1469604 | A | 1/2004 |
| CN | 101064547 | A | 10/2007 |
| CN | 101072065 | A | 11/2007 |
| CN | 101106794 | A | 1/2008 |
| CN | 101132564 | A | 2/2008 |
| CN | 101656964 | A | 2/2010 |
| CN | 101686545 | A | 3/2010 |

(Continued)

OTHER PUBLICATIONS

Newton's Telecom Dictionary, 9th Edition, Sep. 1995, definition of 'ARQ', 3 pages.*

(Continued)

*Primary Examiner* — Melvin Marcelo
(74) *Attorney, Agent, or Firm* — Slater & Matsil, L.L.P.

(57) ABSTRACT

A wireless connection method is applicable to establishing a wireless connection device between an uplink device and a downlink device, and includes obtaining uplink wireless configuration information, and configuring a downlink with the obtained uplink wireless configuration information. A wireless connection is established with the uplink device based on the uplink wireless configuration information and, after successful connection establishment, a wireless connection is established with the downlink device based on the uplink wireless configuration information.

4 Claims, 3 Drawing Sheets

FOREIGN PATENT DOCUMENTS

| | | |
|---|---|---|
| CN | 102318391 A | 1/2012 |
| EP | 1804442 A1 | 7/2007 |
| EP | 1848165 A2 | 10/2007 |
| EP | 1848165 A3 | 5/2011 |
| WO | WO 2008/009228 A1 | 1/2008 |
| WO | WO 2008/025282 A1 | 6/2008 |
| WO | WO 2009/014764 A1 | 1/2009 |
| WO | WO 2010/145302 A1 | 12/2010 |

OTHER PUBLICATIONS

3GPP TS 33.401 V10.0.0 (Mar. 2011) Annex D: Security for Relay Node Architectures, pp. 106-111.*

International Search Report, International Application No. PCT/CN2011/072830, Applicant: Huawei Device Co., Ltd., Mailing date: Jul. 21, 2011, 4 pages.

Extended European Search Report, European Application No. 11163174.3-1249, Applicant: Huawei Device Co., Ltd., Dated: Aug. 24, 2011, 7 pages.

Office Action and Partial Translation received in Chinese Application No. 201010153065.1, mailed Jun. 7, 2012, 10 pages.

Office Action received in European Application No. 11163174.3, mailed Jun. 22, 2012, 6 pages.

Chinese Search Report and translation recieved in Chinese Application No. 201010153065.1, dated Mar, 28, 2012, 4 pages.

* cited by examiner

WIRELESS CONNECTION METHOD AND DEVICE

This application is a continuation of U.S. patent application Ser. No. 13/091,273, entitled "Wireless Connection Method and Device," filed on Apr. 21, 2011, and which claims priority to Chinese Patent Application No. 201010153065.1, filed on Apr. 21, 2010, both of which are incorporated herein by reference.

TECHNICAL FIELD

The present invention relates to a communication technology, and in particular, to a wireless connection method and device.

BACKGROUND

With rapid development of broadband and Wireless Local Area Network (WLAN) services, Wireless Fidelity (WiFi) devices are booming. A WiFi device serves as an uplink device of a wireless connection, and a downlink device establishes a wireless connection with the WiFi device to access a wireless network.

As regards a wireless connection between the uplink device and the downlink device in the prior art, wireless configuration is performed for the two devices one by one in multiple wireless configuration modes to meet the service development and the wireless connection security, for example, WiFi Protected Setup (WPS) configuration, default customized configuration, or configuration based on web or command lines.

In the process of implementing the present invention, the inventor finds at least the following defects in the prior art. Because the coverage scope of WiFi signals is limited, if the distance between the uplink device and the downlink device falls outside the coverage scope of the WiFi signals, the wireless connection between the uplink device and the downlink device is affected, and the downlink device is incapable to connect to the wireless network, which deteriorates the user experience.

SUMMARY OF THE INVENTION

An embodiment of the present invention provides a wireless connection method that is applicable to establishing a wireless connection device between an uplink device and a downlink device. The method includes obtaining uplink wireless configuration information. A downlink is configured with the obtained uplink wireless configuration information and a wireless connection is established with the uplink device based on the uplink wireless configuration information. After successful connection establishment, a wireless connection is established with the downlink device based on the uplink wireless configuration information.

An embodiment of the present invention provides a wireless connection device that is applicable to establishing a wireless connection between an uplink device and a downlink device. The device includes an obtaining module that is adapted to obtain uplink wireless configuration information. A configuring module is adapted to configure a downlink with the uplink wireless configuration information obtained by the obtaining module. A connecting module is adapted to establish a wireless connection with the uplink device based on the uplink wireless configuration information and, after successful connection establishment, to establish a wireless connection with the downlink device based on the uplink wireless configuration information.

BRIEF DESCRIPTION OF THE DRAWINGS

To describe the technical solution under the present invention more clearly, the following introduces the accompanying drawings involved in the embodiments of the present invention. Apparently, the accompanying drawings introduced below are not exhaustive, and persons of ordinary skill in the art can derive other drawings from such accompanying drawings without any creative effort.

DETAILED DESCRIPTION OF ILLUSTRATIVE EMBODIMENTS

To make the technical solution, objectives and merits of the present invention clearer, the following describes the embodiments of the present invention in more detail with reference to accompanying drawings.

Figure 1:
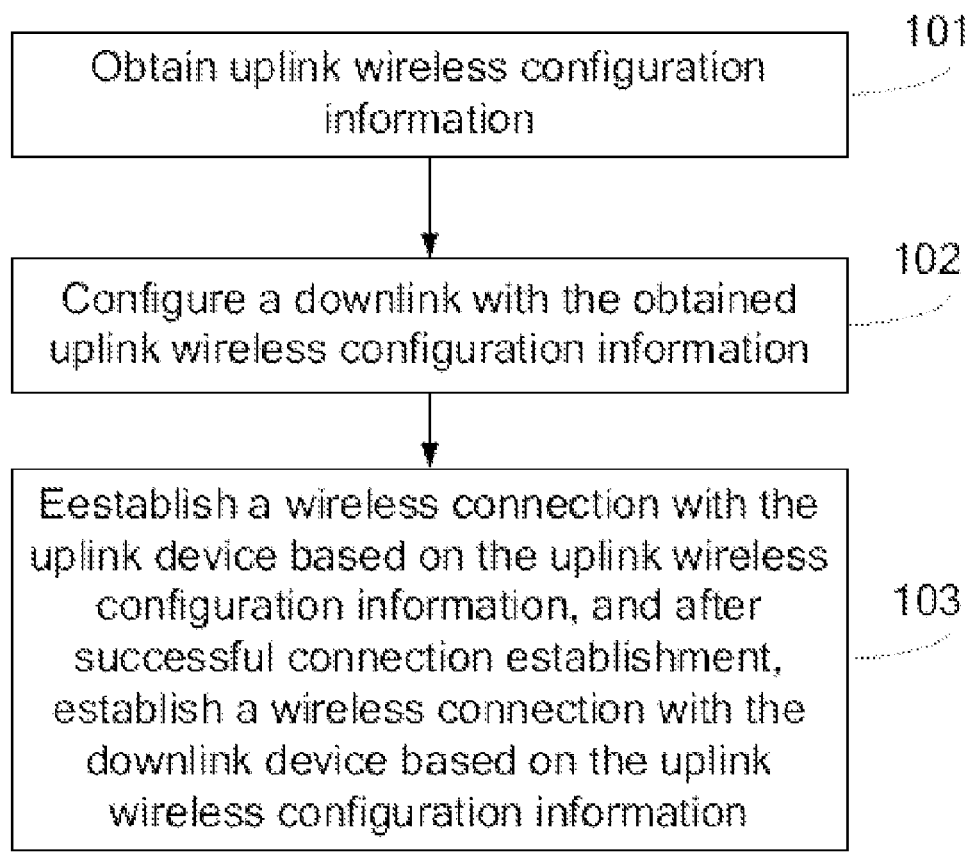
FIG. 1 is a flowchart of a wireless connection method provided in a first embodiment of the present invention.

Referring to FIG. 1, a wireless connection method provided in a first embodiment is applicable to establishing a wireless connection device between an uplink device and a downlink device. The method includes the following processes.

101. Obtain uplink wireless configuration information.

102. Configure a downlink with the obtained uplink wireless configuration information.

103. Establish a wireless connection with the uplink device based on the uplink wireless configuration information, and after successful connection establishment, establish a wireless connection with the downlink device based on the uplink wireless configuration information.

With the method provided in this embodiment, the wireless connection device configures the downlink with the uplink wireless configuration information so that the wireless connection device can be connected with the uplink device and the downlink device simultaneously. When the wireless connection between the uplink device and the downlink device goes beyond the coverage scope of signals, the wireless connection device can establish a wireless connection between the uplink device and the downlink device. Thus, the coverage scope of wireless signals is expanded; the network topology is optimized; and the user experience is improved.

Figure 2:
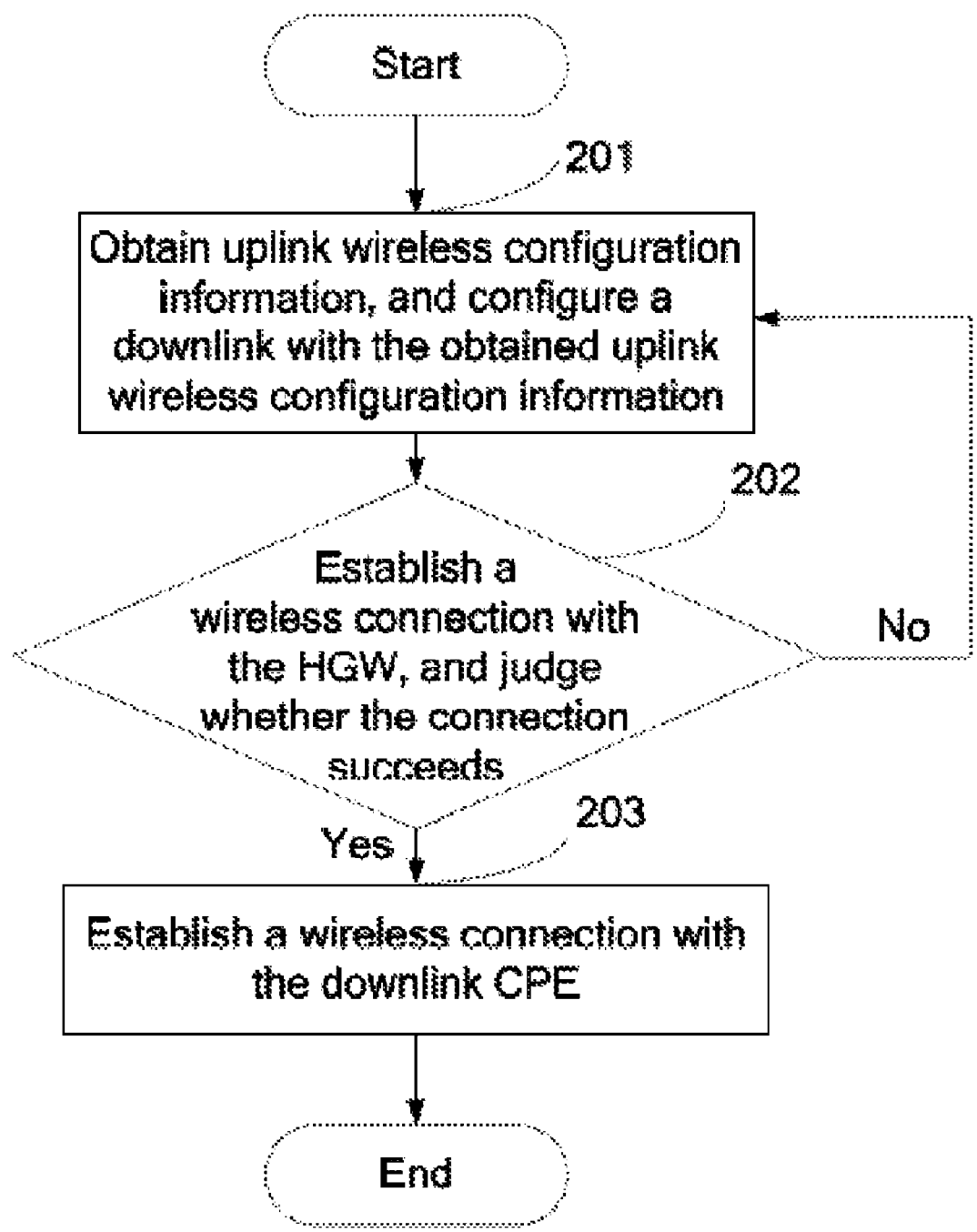
FIG. 2 is a flowchart of a wireless connection method provided in a second embodiment of the present invention.

A second embodiment provides a wireless connection method, which enables a wireless connection device to configure the downlink with the obtained uplink wireless configuration information, so that the wireless connection device can be connected with the uplink device and the downlink device simultaneously, and that the coverage scope of wireless signals is expanded. For ease of description in this embodiment, it is assumed that the WiFi device is a Home Gateway (HGW). That is, the uplink device corresponding to the wireless connection device is an HGW, and the downlink device corresponding to the wireless connection device is a Customer Premises Equipment (CPE). As shown in FIG. 2, the method includes the following processes:

201. Obtain uplink wireless configuration information, and configure the downlink with the obtained uplink wireless configuration information.

Specifically, because the uplink device corresponding to the wireless connection device is uncertain at the time of initializing the wireless connection device, no encryption is applied at the time of initializing the wireless connection device, the default uplink wireless configuration information is applied, and the default Service Set Identifier (SSID) is applied at the downlink. That is, when the wireless connection device is started for the first time, no uplink wireless configuration information exists on the wireless connection device and the wireless device needs to obtain the uplink wireless configuration information.

Besides, if the wireless connection device has established a wireless connection, uplink wireless configuration information should exist on the wireless connection device. If such uplink wireless configuration information does not correspond to the current uplink device, the wireless connection device still needs to obtain the uplink wireless configuration information corresponding to the current uplink device. Therefore, trigger conditions for obtaining the uplink wireless configuration information include at least when it is determined that no uplink wireless configuration information exists on the wireless connection device after the wireless connection device is started or the wireless connection with the uplink device fails. This embodiment does not restrict the trigger conditions.

This embodiment does not restrict the mode of obtaining the uplink wireless configuration information either. The mode may be but is not limited to the following.

(i) If both the uplink device (HGW) and the wireless connection device support the WPS function, the wireless connection device can obtain the uplink wireless configuration information after the WPS function is started on the HGW and the wireless connection device. The wireless connection device obtains the uplink wireless configuration information through the WPS function based on the prior art, which is not described here in this embodiment.

(ii) If the HGW does not support the WPS function, the wireless connection device obtains the uplink wireless configuration information by scanning a configuration page after starting a relay agent and opening the configuration page, and closes the relay agent and configuration page after obtaining the uplink wireless configuration information successfully. The configuration page may be preset or not, which is not restricted in this embodiment as long as the uplink wireless configuration information is available to the wireless connection device.

The method for configuring the downlink with the uplink wireless configuration information is not restricted either in this embodiment. In practice, the uplink wireless configuration information may be transmitted to the downlink through an internal management interface to complete wireless configuration for the downlink.

Optionally, after the downlink is configured with the obtained uplink wireless configuration information, the wireless connection device may be restarted. The wireless connection device may judge at every startup whether the uplink wireless configuration information exists on the wireless connection device. If the uplink wireless configuration information exists on the wireless connection device, the subsequent process 202 is performed directly, where the wireless connection device decides whether to obtain the uplink wireless configuration information by judging whether the connection to the uplink device succeeds.

202. Establish a wireless connection with the HGW, and judge whether the connection succeeds. If the connection succeeds, proceed to process 203. If the connection fails, return to process 201.

With respect to judging whether the HGW is connected successfully, if the uplink wireless configuration information on the wireless connection device corresponds to the current uplink device, the wireless connection device can establish a wireless connection with the uplink device. In other words, the wireless connection device can establish a wireless connection with the uplink device based on the uplink wireless configuration information. If the uplink wireless configuration information on the wireless connection device does not correspond to the current uplink device, the wireless connection device needs to reconfigure the uplink wireless configuration information. In that case, the sequence will return to process 201.

203. Establish a wireless connection with the downlink CPE, after which the procedure can end.

In this process, the wireless connection device establishes a connection with the downlink device only after being connected with the uplink device successfully to ensure that the uplink wireless configuration information on the wireless connection device corresponds to the current uplink device. For this purpose, the wireless connection device establishes a connection with the downlink device only after the downlink is configured with the uplink wireless configuration information. In this way, the downlink device is connected to the wireless network through the uplink device. That is, the wireless connection device establishes a wireless connection with the downlink device based on the uplink wireless configuration information after the connection to the uplink device succeeds.

The downlink CPE and the uplink HGW fall within the coverage scope of the WiFi network and can establish a wireless connection based on the uplink wireless configuration information, and the uplink wireless configuration information exists on the wireless connection device, and the downlink is configured with the uplink wireless configuration information. Therefore, the wireless connection device can serve as an uplink HGW to establish a wireless connection with the downlink CPE. The wireless configuration information on the wireless connection device is the same as the wireless configuration information on the uplink HGW. Therefore, the downlink CPE can establish a wireless connection with the uplink HGW and with the wireless connection device in the same way. For the downlink CPE, two uplink devices are available for connecting.

That is, when the distance between the uplink HGW and the downlink CPE goes beyond the coverage scope of wireless signals, the uplink HGW establishes a wireless connection with the wireless connection device first, and then the wireless connection device establishes a wireless connection with the downlink CPE so that the downlink CPE can access the wireless network normally.

For example, the wireless signals transmitted by the uplink HGW can cover about five meters. Of course, five meters is only an example and this embodiment is not restricted in terms of the covered area of wireless signals. In practice, the covered area is adjustable according to the actual conditions. The downlink CPE can access the wireless network by connecting to the uplink HGW, only when the uplink HGW is less than five meters away from the downlink CPE. When the two devices are more than five meters apart, the wireless connection fails.

After the method provided in this embodiment is applied, the wireless connection device can be connected with the uplink HGW within five meters, and the downlink CPE can establish a wireless connection with the wireless connection device beyond five meters and can still access the wireless network. Therefore, the method in this embodiment essentially expands the coverage scope of wireless signals and improves the quality of the wireless connection.

Optionally, to ensure security of the wireless connection, the wireless connection device can perform encryption and save encryption information after configuring the downlink with the uplink wireless configuration information. In this way, a user can use the wireless connection only after being authenticated successfully through the encryption information. The encryption process is based on the prior art and is not restricted in this embodiment.

With the method provided in this embodiment, the wireless connection device configures the downlink with the uplink wireless configuration information so that the wireless connection device can be connected with the uplink device and the downlink device simultaneously. When the wireless connection between the uplink device and the downlink device goes beyond the coverage scope of signals, the wireless connection device can establish a wireless connection between the uplink device and the downlink device. Thus, the coverage scope of wireless signals is expanded, the quality of the wireless connection is ensured, the network topology is optimized, and the user experience is improved.

Figure 3:
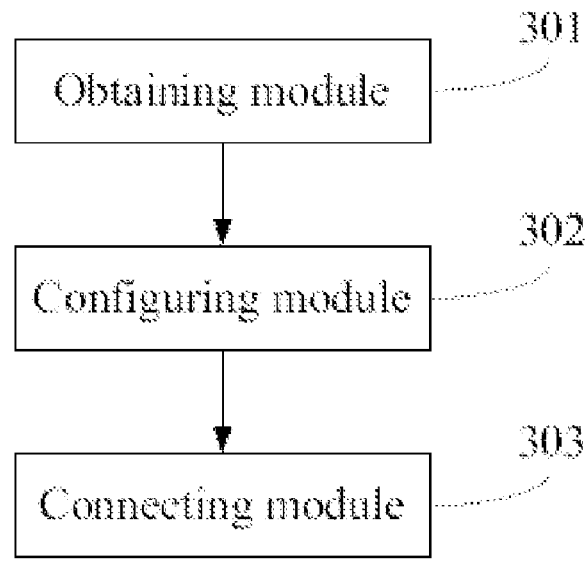
FIG. 3 is a schematic diagram showing a structure of a wireless connection device provided in a third embodiment of the present invention.

Referring to FIG. 3, a wireless connection device provided in one embodiment is applicable to establishing a wireless connection between an uplink device and a downlink device. The device includes an obtaining module 301, a configuring module 302, and a connecting module 303.

The obtaining module 301 is adapted to obtain uplink wireless configuration information. In this embodiment, because the uplink device corresponding to the wireless connection device is uncertain at the time of initializing the wireless connection device, no encryption is applied at the time of initializing the wireless connection device. The default uplink wireless configuration information is applied and the default SSID is applied at the downlink. That is, when the wireless connection device is started for the first time, no uplink wireless configuration information exists on the wireless connection device, and the wireless device needs to obtain the uplink wireless configuration information.

Besides, if the wireless connection device has established a wireless connection, uplink wireless configuration information should exist on the wireless connection device. If such uplink wireless configuration information does not correspond to the current uplink device, the wireless connection device still needs to obtain the uplink wireless configuration information corresponding to the current uplink device. Therefore, the obtaining module 301 is further adapted to obtain the uplink wireless configuration information corresponding to the uplink device if the wireless connection device determines that no uplink wireless configuration information exists on the wireless connection device after the wireless connection device is started. Alternatively, or additionally, the obtaining module 301 is further adapted to obtain the uplink wireless configuration information corresponding to the uplink device when the connecting module fails to establish a wireless connection with the uplink device based on the uplink wireless configuration information, which is not restricted in this embodiment.

In this embodiment, the mode of obtaining the uplink wireless configuration information may be, but is not limited to, the following.

(i) If both the uplink device (HGW) and the wireless connection device support the WPS function, the wireless connection device can obtain the uplink wireless configuration information after the WPS function is started on the HGW and the wireless connection device. The wireless connection device obtains the uplink wireless configuration information through the WPS function based on the prior art, which is not described here in this embodiment.

(ii) If the HGW does not support the WPS function, the wireless connection device obtains the uplink wireless configuration information by scanning a configuration page after starting a relay agent and opening the configuration page, and closes the relay agent and the configuration page after obtaining the uplink wireless configuration information successfully. The configuration page may be preset or not, which is not restricted in this embodiment as long as the uplink wireless configuration information is available to the wireless connection device.

That is, the obtaining module 301 is further adapted to start a relay agent and open a configuration page and to obtain the uplink wireless configuration information by scanning the configuration page.

The configuring module 302 is adapted to configure a downlink with the uplink wireless configuration information obtained by the obtaining module 301.

The connecting module 303 is adapted to establish a wireless connection with the uplink device based on the uplink wireless configuration information and, after successful connection establishment, establish a wireless connection with the downlink device based on the uplink wireless configuration information.

Figure 4:
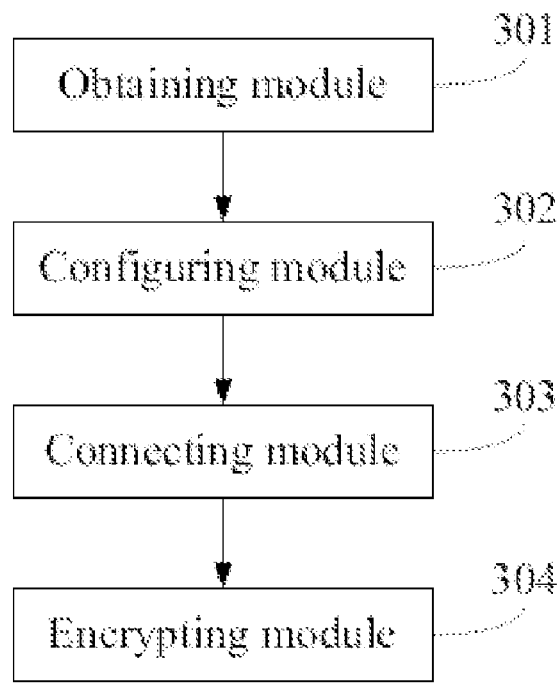
FIG. 4 is a schematic diagram showing another structure of a wireless connection device provided in the third embodiment of the present invention.

Optionally, as shown in FIG. 4, the wireless connection device further includes an encrypting module 304 that is adapted to encrypt wireless connection settings and save encryption information after configuring the downlink with the obtained uplink wireless configuration information.

It should be noted that the encryption operation may be performed by the encrypting module 304 after the configuring module 302 configures the downlink with the obtained uplink wireless configuration information or after the connecting module 303 finishes the connecting operation, which is not restricted in this embodiment. In one example, the encryption operation is performed after the connecting module 303 finishes the connecting operation.

The wireless connection device provided in this embodiment configures the downlink with the uplink wireless configuration information so that the wireless connection device can be connected with the uplink device and the downlink device simultaneously. When the wireless connection between the uplink device and the downlink device goes beyond the coverage scope of signals, the wireless connection device can establish a wireless connection between the uplink device and the downlink device. Thus, the coverage scope of wireless signals is expanded, the quality of the wireless connection is ensured, the network topology is optimized, and the user experience is improved.

It should be noted that the functional modules of the wireless connection device for establishing the wireless connection in the embodiments above are exemplary only. In practice, the functions of such modules may be undertaken by different functional modules, namely, the internal structure of the device may be divided into different functional modules to implement all or part of the functions described above. Besides, the wireless connection device above and the wireless connection method above are based on the same conception, and the detailed implementation process is described in the method embodiment, and thus is not repeated described in detail here.

The sequence numbers of the embodiments above are intended to facilitate description only, and do not represent the priority or preference of each embodiment.

All or part of the process specified in any embodiment of the present invention may be implemented by software programs. The software programs may be stored in a readable storage medium such as a hard disk or a Compact Disk-Read Only Memory (CD-ROM).

The above descriptions are merely some exemplary embodiments of the present invention, but are not intended to limit the scope of the present invention. Any modifications, variations or replacements that can be easily derived by those skilled in the art without departing from the scope of the invention shall fall within the scope of the present invention.

What is claimed is:

1. A wireless connection method applicable to a wireless connection device for establishing a wireless connection between a Home Gateway (HGW) and a Customer Premises Equipment (CPE), the method comprising:
    obtaining uplink wireless configuration information;
    configuring a downlink with the obtained uplink wireless configuration information;
    establishing a wireless connection with the HGW based on the uplink wireless configuration information; and
    after successful connection establishment, establishing a wireless connection with the CPE based on the uplink wireless configuration information;
    wherein obtaining the uplink wireless configuration information comprises:
        starting, by the wireless connection device, a relay agent and opening a configuration page that is preset in the wireless connection device if the wireless connection device determines that no uplink wireless configuration information exists on the wireless connection device after the wireless connection device is started; and
        obtaining the uplink wireless configuration information corresponding to the HGW by scanning the configuration page which is preset in the wireless connection device.

2. The method according to claim 1, wherein, after configuring the downlink, the method further comprises encrypting wireless connection settings and saving encryption information.

3. A wireless connection device applicable to establishing a wireless connection between a Home Gateway (HGW) and a Customer Premises Equipment (CPE), the wireless connection device comprising a processor and a memory, wherein the memory is configured to store program code corresponding to a wireless connection method and the processor is configured to implement the wireless connection method from the memory, wherein the wireless connection method comprises:
    obtaining uplink wireless configuration information;
    configuring a downlink with the obtained uplink wireless configuration information;
    establishing a wireless connection with the HGW based on the uplink wireless configuration information; and
    after successful connection establishment, establishing a wireless connection with the CPE based on the uplink wireless configuration information;
    wherein obtaining the uplink wireless configuration information comprises starting, by the wireless connection device, a relay agent and opening a configuration page that is preset in the wireless connection device if the wireless connection device determines that no uplink wireless configuration information exists on the wireless connection device after the wireless connection device is started: and
    obtaining the uplink wireless configuration information corresponding to the HGW by scanning the configuration page which is preset in the wireless connection device.

4. The wireless connection device according to claim 3, wherein the method further comprises encrypting wireless connection settings and saving encryption information.

* * * * *